(12) United States Patent
Rautalin et al.

(10) Patent No.: US 10,564,292 B2
(45) Date of Patent: Feb. 18, 2020

(54) SUPPORTING AN ESTIMATION OF SATELLITE LOCATIONS

(71) Applicant: HERE GLOBAL B.V., Eindhoven (NL)

(72) Inventors: Sakari Rautalin, Tampere (FI); Simo Ali-Löytty, Tampere (FI); Robert Piché, Tampere (FI); Juha Tapani Ala-Luhtala, Helsinki (FI)

(73) Assignee: HERE Global B.V., Eindhoven (NL)

( * ) Notice: Subject to any disclaimer, the term of this patent is extended or adjusted under 35 U.S.C. 154(b) by 354 days.

(21) Appl. No.: 15/458,469

(22) Filed: Mar. 14, 2017

(65) Prior Publication Data
US 2017/0269221 A1 Sep. 21, 2017

(30) Foreign Application Priority Data

Mar. 15, 2016 (GB) .................................. 1604405.9

(51) Int. Cl.
*G01S 19/40* (2010.01)
(52) U.S. Cl.
CPC .................................. *G01S 19/40* (2013.01)
(58) Field of Classification Search
CPC ........ G01S 19/27; G01S 19/40; G06F 8/4434; G06F 8/4441
USPC ................................................... 342/357.23
See application file for complete search history.

(56) References Cited

U.S. PATENT DOCUMENTS

| 8,274,430 | B2 | 9/2012 | Garin |
| 8,538,682 | B1 * | 9/2013 | Vankatrannan ......... G01S 19/27 |
| | | | 701/408 |
| 8,847,820 | B2 | 9/2014 | Landau et al. |
| 2007/0273581 | A1 | 11/2007 | Garrison et al. |
| 2009/0009389 | A1 | 1/2009 | Mattos |

(Continued)

FOREIGN PATENT DOCUMENTS

| CN | 103675861 A | 3/2014 |
| WO | WO 2010/047875 A2 | 4/2010 |
| WO | WO 2012/125293 A2 | 9/2012 |

OTHER PUBLICATIONS

Andrei Pukkila, Juha Ala-Luhtala, Robert Piche, and Simo Ali-Löytty, GNSS orbit prediction with enhanced force model. In International Conference on Localization and GNSS 2015 (ICL-GNSS 2015), pp. 1-6, Jun. 2015.

(Continued)

*Primary Examiner* — Timothy X Pham
(74) *Attorney, Agent, or Firm* — Alston & Bird LLP

(57) ABSTRACT

An apparatus computes first locations of a satellite for several points in time based on a first set of parameters values broadcast by the satellite for a first validity period and second locations of the satellite for these points in time based on a second set of parameter values with associated second validity period. The first or second validity period is extended by an equation of motion, which includes forces acting on the satellite. The apparatus computes a value of an error component for points in time by comparing first with second locations and fits parameter values of a model to the values of the error component to obtain a model of a time-evolution of values of the error component. The apparatus provides the model of the time-evolution as a basis for a correction of locations of the satellite that are computed based on the first set of parameter values.

22 Claims, 6 Drawing Sheets

(56) References Cited

U.S. PATENT DOCUMENTS

| | | | | |
|---|---|---|---|---|
| 2009/0091493 | A1* | 4/2009 | Hwang | G01S 19/07 342/357.44 |
| 2010/0060519 | A1* | 3/2010 | Uchida | G01S 19/05 342/357.64 |
| 2011/0025555 | A1* | 2/2011 | Whitehead | G01S 19/33 342/357.24 |
| 2011/0071808 | A1 | 3/2011 | Garrison et al. | |
| 2011/0254733 | A1* | 10/2011 | Abraham | G01S 19/27 342/357.66 |
| 2012/0154216 | A1* | 6/2012 | Onda | G01S 19/05 342/357.64 |
| 2013/0227377 | A1* | 8/2013 | Rao | G01S 19/27 714/776 |
| 2014/0125519 | A1 | 5/2014 | Brown et al. | |
| 2014/0184442 | A1 | 7/2014 | Large et al. | |
| 2015/0070211 | A1 | 3/2015 | Cheng et al. | |
| 2015/0362597 | A1* | 12/2015 | Syrjarinne | G01S 19/20 342/357.58 |
| 2016/0077214 | A1* | 3/2016 | Xianglin | G01S 19/24 342/357.27 |
| 2018/0208140 | A1* | 7/2018 | Sugimoto | G01S 19/07 |
| 2018/0252818 | A1* | 9/2018 | Sato | G01S 19/07 |

OTHER PUBLICATIONS

J. Ala-Luhtala, M. Seppanen, S. Ali-Loytty, R. Piche, and H. Nurminen. Estimation of initial state and model parameters for autonomous GNSS orbit prediction. In International Global Navigation Satellite Systems Society Symposium 2013 (IGNSS2013), Jul. 2013.

M. Seppänen, J. Ala-Luhtala, R. Piché, S. Martikainen and S. Ali-Lööytty, Autonomous prediction of GPS and GLONASS satellite orbits. Navigation, 59(2):119-134, 2012.

Marquardt, D; "An algorithm for least-squares estimation of non-linear parameters"; Journal of the Society for Industrial and Applied Mathematics, 11(2):431-441, 1963.

Simo Ali-Löytty, GNSS Orbit Prediction and Parametric Fingerprint Positioning Methods Using Crowdsourced Data, [online] [retrieved Mar. 3, 2017]. Retrieved from the Internet: <URL:http://www.ipam.ucla.edu/abstract/?tid=13224&pcode=TRAWS2>. 3 pages.

Extended European Search Report for Application No. EP 17 15 9123 dated Sep. 21, 2017, 8 pages.

* cited by examiner

SUPPORTING AN ESTIMATION OF SATELLITE LOCATIONS

CROSS-REFERENCE TO RELATED APPLICATIONS

This application claims priority to GB Application No. 1604405.9, filed Mar. 15, 2016, the entire contents of which are incorporated herein by reference.

FIELD OF THE DISCLOSURE

The invention relates to the field of satellite signal based positioning and more specifically to supporting an estimation of satellite locations.

BACKGROUND

Satellite locations may have to be estimated in the scope of a satellite signal based positioning.

A satellite signal based positioning may be based for example on any kind of present and/or future Global Navigation Satellite System (GNSS), such as the Global Positioning System (GPS), GLONASS, Galileo, the BeiDou Navigation Satellite System (BDS), etc., or any combination thereof.

In a GNSS system, satellites orbiting the Earth transmit signals that a receiver may use to calculate its own position. The signals transmitted by a satellite convey a message, and a part of the message comprises a set of parameter values of an orbit model defining an orbit of the satellite for a limited period of time. Such parameter values are referred to in some of the GNSSs as the broadcast ephemeris (BE). They can be used by the receiver to compute the location of the satellite, for example in an Earth-Centered-Earth-Fixed (ECEF) coordinate system. Based on the estimated locations of a plurality of satellites and the propagation time of the signals, the receiver may compute its own position. The propagation time may be estimated from a time of transmission of the satellite signal indicated in the message and a measured time of arrival of the satellite signal at the receiver. The parameter values of the orbit model have a certain, limited validity time, during which the satellite's location can be estimated with a desired accuracy. Positioning accuracy decreases as the age of the parameter values for a satellite increases, and eventually the receiver must receive a new set of parameter values of the orbit model before it can continue with positioning.

It is possible to extend the usability of a received broadcast ephemeris beyond its intended lifespan. A corresponding method may be referred to as Ephemeris extension service (EES). It is usually performed on-device at the receiver, with or without the usage of external assistance data.

In a typical EES system, the orbit of a satellite is predicted by integrating output values of an equation of motion defined for the satellite. The last reliable satellite location that can be determined with broadcast ephemeris data may be used as an initial state of the orbit for the integration. The equation of motion is also called force model, as it is based on forces acting on the satellite. Ideally the equation of motion includes all the forces affecting the satellite. However, in practice it may not feasible to model all the forces and typically the equation of motion includes only the four major forces: gravitational forces of the Earth, the Sun and the Moon and solar radiation pressure.

SUMMARY OF SOME EMBODIMENTS OF THE INVENTION

A method is described, which comprises computing a first plurality of locations of a satellite of a satellite navigation system for a plurality of points in time based on a first set of parameters values of an orbit model, the first set of parameters values broadcast by the satellite for a first validity period. The method further comprises computing a second plurality of locations of the satellite for the plurality of points in time based on at least one second set of parameter values of an orbit model, the at least one second set of parameter values broadcast by the satellite earlier than the first set of parameter values for at least one second validity period, wherein for computing the first plurality of locations and the second plurality of locations of the satellite, the first validity period or the at least one second validity period is extended by an equation of motion for the satellite, which includes at least one force acting on the satellite. The method further comprises computing a value of at least one error component for each of the plurality of points in time by comparing the computed first plurality of locations of the satellite with the computed second plurality of locations of the satellite. The method further comprises fitting parameter values of a model having at least one periodic component to the computed values of the at least one error component to obtain a model of a time-evolution of values of the at least one error component. The method further comprises providing the model of the time-evolution of the values of the at least one error component as a basis for a correction of locations of the satellite that are computed based on the first set of parameter values for points in time outside of the first validity period. The actions of the method may be performed by an apparatus.

Moreover, a first apparatus is described, which comprises means for performing the actions of any one embodiment of the described method.

The means of this apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit.

The apparatus may comprise a single means for all functions, a common plurality of means for all functions, or a plurality of different means for different functions.

Moreover, a second apparatus is described, which comprises at least one processor and at least one memory including computer program code, the at least one memory and the computer program code with the at least one processor configured to cause the apparatus at least to perform the actions of any one embodiment of the presented method.

Moreover, a non-transitory computer readable storage medium is described, in which computer program code is stored. The computer program code causes an apparatus to perform the actions of any one embodiment of the presented method when executed by the processor.

The computer readable storage medium could be for example a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that also the computer program code by itself has to be considered an embodiment of the invention.

Any of the described apparatuses may comprise only the indicated components or one or more additional components.

In one embodiment, the described method is an information providing method, and the described first apparatus is an information providing apparatus. In one embodiment, the means of the described first apparatus are processing means.

In certain embodiments of the described methods, the methods are methods for supporting and estimation of satellite locations. In certain embodiments of the described apparatuses, the apparatuses are apparatuses for supporting an estimation of satellite locations.

It is to be understood that any feature presented for a particular exemplary embodiment may also be used in an analog manner in combination with any other described exemplary embodiment of any category.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
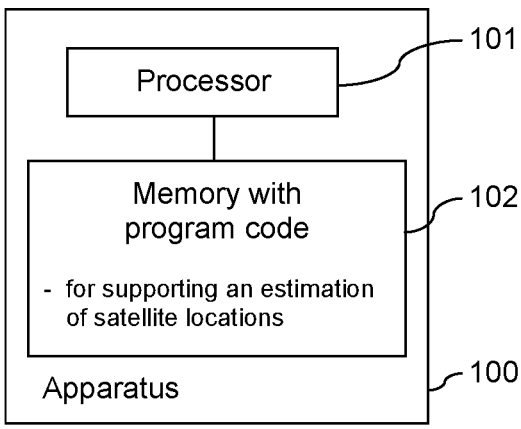
FIG. 1 is a schematic block diagram of an example embodiment of an apparatus according to the invention.

FIG. 1 is a schematic block diagram of an example embodiment of any apparatus according to the invention. Apparatus 100 comprises a processor 101 and, linked to processor 101, a memory 102. Memory 102 stores computer program code for supporting an estimation of satellite locations. Processor 101 is configured to execute computer program code stored in memory 102 in order to cause an apparatus to perform desired actions. Memory 102 is thus an example embodiment of a non-transitory computer readable storage medium, in which computer program code according to the invention is stored.

Apparatus 100 could be any kind of mobile device that is configured to be operable as well when in motion. An example of a mobile device may be a mobile communication device, a smartphone, a navigation device, a camera, a device comprising a camera, a mobile computing device, or a laptop, etc. It could be a handheld device or a device that is meant to be integrated into a larger mobile entity, for instance a navigation device that is integrated into a vehicle. Apparatus 100 could also be a stationary device, which is configured to operate only when stationary. An example of a stationary device may be a server. Apparatus 100 could equally be a component, like a chip, circuitry on a chip or a plug-in board, for any mobile or stationary device. Optionally, apparatus 100 could comprise various other components, like a camera, a data interface configured to enable an exchange of data with a server or any other device, a satellite signal receiver, a user interface like a touchscreen, a further memory, a further processor, etc.

An operation of an apparatus will now be described with reference to the flow chart of FIG. 2. The operation is an example embodiment of a method according to the invention. Processor 101 and the program code stored in memory 102 cause an apparatus to perform the operation when the program code is retrieved from memory 102 and executed by processor 101. The apparatus that is caused to perform the operation can be apparatus 100 or some other apparatus, for example but not necessarily a device comprising apparatus 100.

The apparatus computes a first plurality of locations of a satellite of a satellite navigation system for a plurality of points in time based on a first set of parameters values of an orbit model, the first set of parameters values broadcast by the satellite for a first validity period. (action 201) The satellite navigation system may be a GNSS, but it may equally be for instance an autonomous regional satellite navigation system, or a global or regional satellite-based augmentation system (SBAS). An example for a regional satellite-based augmentation system is the Quasi-Zenith Satellite System (QZSS).

The apparatus moreover computes a second plurality of locations of the satellite for the plurality of points in time based on at least one second set of parameter values of an orbit model, the at least one second set of parameter values broadcast by the satellite earlier than the first set of parameter values for at least one second validity period. For computing the first plurality of locations and the second plurality of locations of the satellite, the first validity period or the at least one second validity period is extended by an equation of motion for the satellite, which includes at least one force acting on the satellite. (action 202)

Each set of parameter values may contain values of parameters of an orbit model defining the orbit of a particular satellite for a certain validity period. The validity period may be a period of predetermined length, for example a period in which a location of the satellite computed based on the set of parameter values is expected to have a desired accuracy. The at least one second validity period may differ entirely or partially from the first validity period. The at least one second set of parameter values may comprise one or more sets of parameter values, each having its own validity period. Several second sets of parameter values may thus cover several spaced apart, adjacent and/or overlapping validity periods.

The location of the satellite is thus computed twice for several points in time using different sets of parameter values as a basis in each case. One of the computations for each point in time may be performed using as a basis a set of parameter values having a validity period which comprises the respective point in time so that it may be assumed that the computed location is quite accurate. The other one of the computations for each point in time may be performed using as a basis a set of parameter values having a validity period which does not comprise the respective point in time. In this case, a force model may be used in addition to the respective set of parameter values for predicting the satellite location at the required point in time.

The apparatus moreover computes a value of at least one error component for each of the plurality of points in time by comparing the computed first plurality of locations of the satellite with the computed second plurality of locations of the satellite. (action 203) The values of the error components may be determined for each point in time for instance based on a discrepancy between a respective location that has been computed for this point in time based on the currently received first set of parameter values and a location that has been computed for this point in time based on one of the at least one stored second set of parameter values.

The apparatus moreover fits parameter values of a model having at least one periodic component to the computed values of the at least one error component to obtain a model of a time-evolution of values of the at least one error component. (action 204) A model of a time-evolution may thus be a general model that has a frequency component and that is adapted to a particular satellite for a certain span of time by setting parameter values of the general model accordingly. The model of the time-evolution may allow estimating a value of an error component for any point in time.

The apparatus moreover provides the model of the time-evolution of values of the at least one error component as a basis for a correction of locations of the satellite that are computed based on the first set of parameter values for points in time outside of the first validity period. (action 205) It is to be understood that if the model of the time-evolution is provided for use at a separate device, only parameter values specifying a general model may be provided.

The invention is based on the consideration that while conventional orbit model extension methods can be used to extend the life span of orbit model data taking account of the four major forces, the forces left out from the equation of motion, also called unmodeled forces, are relatively small, but still give a significant contribution to the orbital error in long orbit predictions ranging from several days to weeks. Moreover, there are further sources of orbital errors, including inaccuracies in the models, inaccuracies in the initial state of the satellite and inaccuracies in the model parameters. Such inaccuracies in the model parameters may relate, for example, to Earth orientation parameters used in coordinate transformations. Improving the force model and the initial state estimation increases the complexity of the force model and thus the computational load with relatively small reduction in the orbital errors.

Since the orbital errors in long predictions are mainly caused by inaccuracies in the prediction model and by leaving out some of the smaller forces, the orbit errors may not be completely random in nature. Rather, most predictions may contain systematic features. The orbital errors may contain systematic features in that they may comprise a certain periodicity and in that they may increase in a manner that may be reflected by a model.

Certain embodiments of the invention therefore provide that systematic features in error components are exploited for enabling a correction of computed locations. To this end, a prediction model for a time-evolution of values of at least one error component is determined based on at least two sets of parameter values broadcast by a satellite of a satellite navigation system by exploiting systematic characteristics of the values of the at least one error component. Each set of parameter values broadcast by the satellite enables a computation of a location of the satellite at different points in time and is provided for a respective validity period. The at least one error component is an error component that is expected to occur when computing locations of the satellite based on one of the sets of parameter values outside of the respectively associated validity period, even if using some extension measures. The prediction model for the time-evolution may thus be provided as a basis for correcting locations of the satellite that are computed based on the first set of parameter values when the locations are computed outside of the validity period of the first set of parameters. The value of one or more error components may be predicted based on the prediction model as a function of time separately for each satellite location that is to be corrected.

Certain embodiments of the invention may thus have the effect that the value of one or more error components occurring in orbit predictions can be reduced without introducing additional terms to an equation of motion for the satellite. The approach may be computationally light, that is, it may require little additional processor time. Nevertheless, the quality of satellite locations that are estimated outside of the validity time of the used set of parameters may be increased significantly. Also the time during which a set of parameters can be used may be extended.

Figure 2:
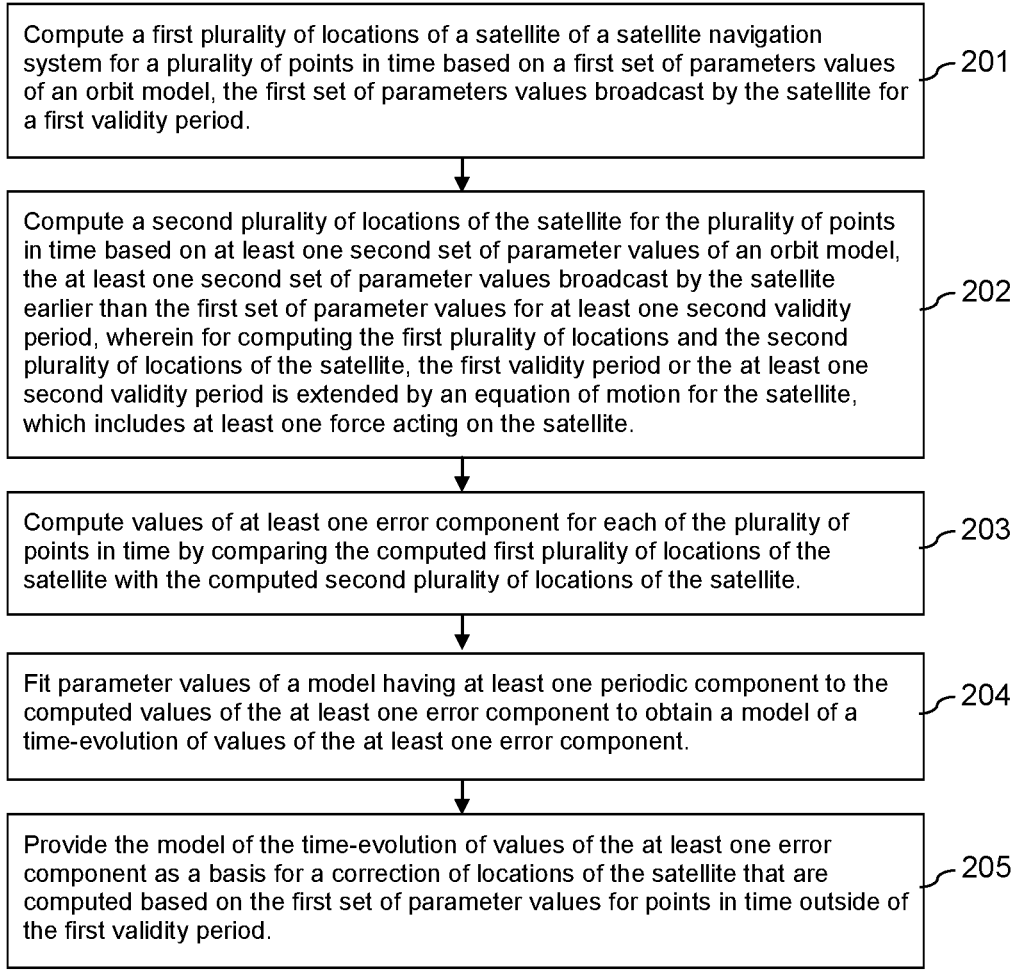
FIG. 2 is a flow chart illustrating an example operation in the apparatus of FIG. 1.

Apparatus 100 illustrated in FIG. 1 and the method illustrated in FIG. 2 may be implemented and refined in various ways.

The apparatus may receive the first and second sets of parameter values for example directly from the satellite by means of a satellite signal receiver of the apparatus, or via a satellite signal receiver of a device comprising the apparatus. Alternatively, the apparatus may receive the sets of parameter values from a separate entity, for instance from a positioning assistance server. At least some of the sets of parameter values may be stored before being processed, for example in the apparatus or in a device comprising the apparatus or in any memory that is accessible to the apparatus.

The points in time for which two sets of satellite locations are computed may be selected for instance depending on the availability of sets of parameter values and associated validity periods.

In an example embodiment, the plurality of points in time for which the first plurality of locations of the satellite are computed lie outside of the first validity period. Computing the first plurality of locations of the satellite for the plurality of points in time may then comprise extending the first validity period by an equation of motion for the satellite, which models at least one force acting on the satellite. The equation of motion may be used in this case for instance for a backward prediction of the satellite locations. In another example embodiment, the plurality of points in time for which the second plurality of locations of the satellite are computed lie outside of the at least one second validity period. Computing the second plurality of locations of the satellite for the plurality of points in time may then comprise extending the at least one second validity period by an equation of motion for the satellite, which models at least one force acting on the satellite. The equation of motion may be used in this case for instance for a forward prediction of the satellite locations. The at least one force may comprise in both embodiments for instance the gravitational forces of the Earth, the Sun and the Moon and solar radiation pressure, as the four major forces. Still, it is to be understood that one or more of these major forces may be omitted and/or that one or more minor forces may be added.

Computing a location of the satellite based on a particular set of parameter values at a particular point in time outside of the validity period of the particular set of parameter values may comprise computing a location of the satellite based on the particular set of parameter values for a point in time within the validity period as an initial state for an integration of output values of the equation of motion for the satellite.

In an example embodiment, each of the first set of parameter values and the at least one second set of parameter values comprises a respective set of ephemeris data. The ephemeris data may be ephemeris data broadcast by any satellite navigation system satellite, for example a GPS satellite, a BeiDou satellite, a GLONASS satellite or a Galileo satellite. Ephemeris data can be used to accurately calculate the location of a satellite at a particular point in time, as long as the point in time lies within the prescribed validity period. The prescribed validity period may depend on the type of satellite navigation system. It may be, for example, approximately four hours. Prior information about the parameter values of the model having at least one periodic component can be utilized by using regularized optimization.

In an example embodiment, the first plurality of locations of the satellite and the second plurality of locations of the satellite are computed as coordinates in an Earth centered, Earth fixed coordinate system. Computing a value of at least one error component for each of the plurality of points in time by comparing the computed first plurality of locations of the satellite with the computed second plurality of locations of the satellite may then comprise transforming deviations between the computed first plurality of locations of the satellite and the computed second plurality of locations of the satellite into values of at least one error component in a Radial-Tangential-Normal coordinate system. In the present context, the Radial-Tangential-Normal coordinate system may be a system in which a radial coordinate R points from the center of the Earth to the satellite, in which a normal coordinate N points to the direction of the cross product of the position and the velocity of the satellite, and in which a tangential coordinate T points to the direction of the cross product of vectors pointing in N and R directions. The cross product may be used so that components are perpendicular to each other. In a Radial-Tangential-Normal coordinate system, the error components may have a clearly characteristic behavior, in particular a systematic periodical behavior. Modeling the time-evolution of error components in a Radial-Tangential-Normal coordinate system may therefore have the effect that the errors may be modeled particularly well and using simple error curves. It is to be understood, however, that other coordinate systems may be used just the same, and that a transformation between coordinate systems is not essential to the presented approach.

In an example embodiment, the at least one error component comprises a radial error component and/or a tangential error component and/or a normal error component of a Radial-Tangential-Normal satellite centered coordinate system. Any combination of these error components may be considered. Radial and tangential errors may have the largest contribution to the error of a computed location of a satellite. In order to achieve a satisfactory effect of the achievable error reduction with limited effort, thus a radial error component and a tangential error component may be considered, while a normal error component may be neglected. It is to be understood that additional components may be considered as well. Furthermore, it is to be understood that other error components may be considered in case any other coordinate system is used.

In an example embodiment, the at least one error component comprises at least two error components and the model of a time-evolution of the values of the at least one error component comprises a separate error function for each of the at least two error components. This may have the effect that the influence of each component may be reflected individually and thus more precisely.

Nevertheless, different error components may have correspondences that may be exploited.

In an example embodiment, the at least one error component comprises at least a radial error component and a tangential error component of a Radial-Tangential-Normal satellite centered coordinate system. The phases of a radial error component and the phase of a tangential error component may have a strong correlation. Therefore, a phase of an error function for the radial error component obtained by fitting parameter values of the model having at least one periodic component to the computed values of the radial error component may be used in fitting parameter values of the model having at least one periodic component to the computed values of the tangential error component to obtain an error function for the tangential error component. This may have the effect that the number of parameters that have to be considered can be reduced and that a more accurate estimate may be obtained.

In an example embodiment, fitting parameter values of a model having at least one periodic component to the computed values of the at least one error component comprises applying a non-linear optimization algorithm, for example a non-linear least square fitting algorithm. Such an algorithm may be for instance a Levenberg-Marquardt algorithm, which may converge with a particularly high probability. Any other optimization algorithm, like a Gauβ-Newton algorithm or a Gradient-Decent algorithm, may be used as well, though.

In an example embodiment, a quality of the obtained model of a time-evolution of the values of the at least one error component is monitored. Based on the monitored quality, a repetition rate of obtaining a model of a time-evolution of the values of the at least one error component may be adjusted. This may have the effect that poor optimization results may be detected and that their effect be minimized.

In an example embodiment, a location of the satellite at a particular point in time may furthermore be computed based on the first set of parameter values. A value of the at least one error component for the particular point in time may then be estimated using the provided model of the time-evolution of the values of the at least one error component. The computed location of the satellite may be corrected based on the estimated value of the at least one error component. A position of the apparatus at the particular point in time may then be computed using the corrected location of the satellite. It is to be understood that in this latter computation, the location or corrected location of other satellites will be considered in addition. This may have the effect that an accurate position of a satellite and as a result an accurate position of the apparatus may be determined with long intervals between the receipt or extraction or decoding of respectively new broadcast parameter values. For computing the location of the satellite at a particular point in time, an initial location may be computed based on the first set of parameter values, which may then be used as a starting point for predicting the location at the particular point in time using an equation of motion or force model.

Figure 3:
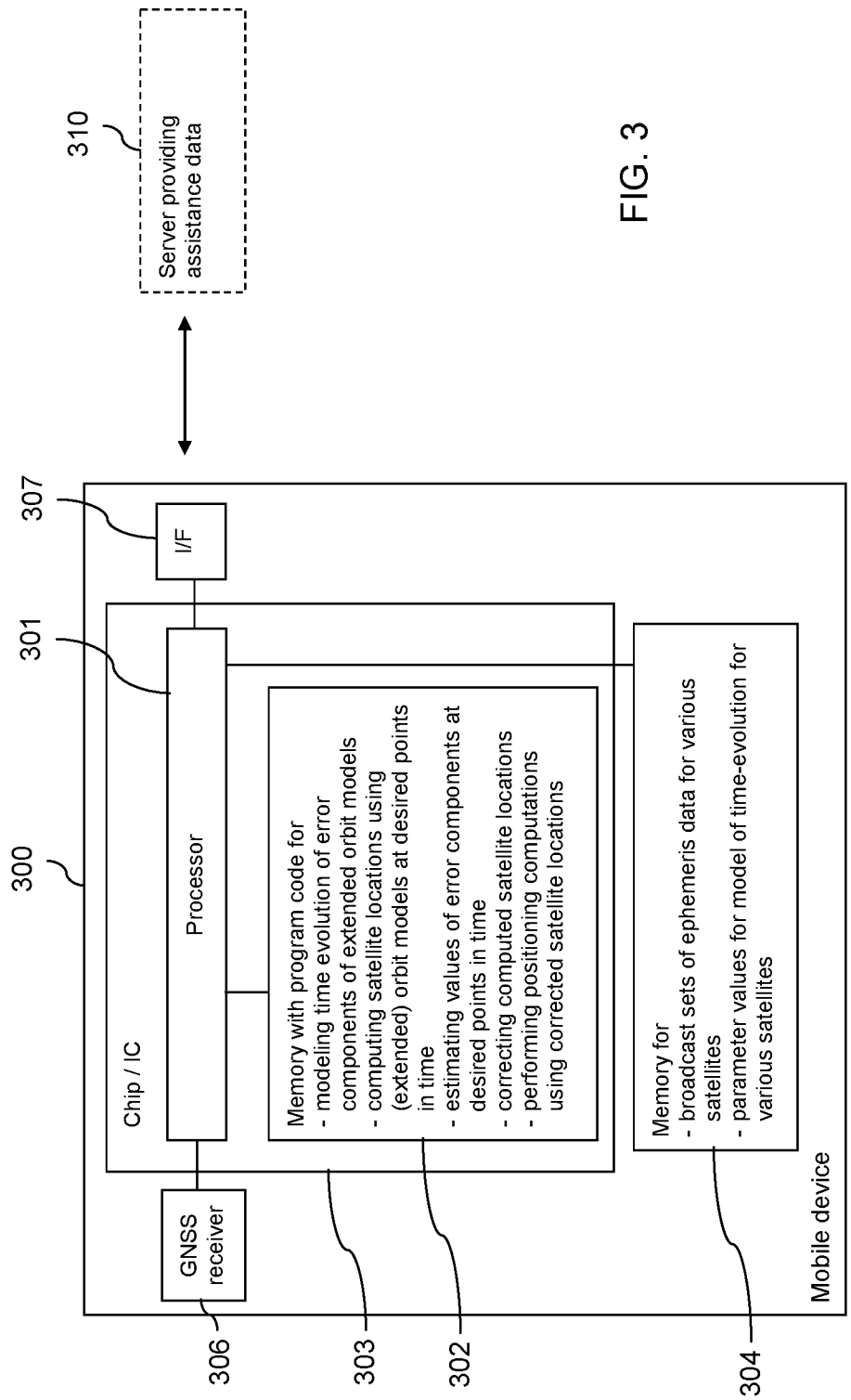
FIG. 3 is a schematic block diagram of an example embodiment of system comprising an example apparatus according to the invention.

FIG. 3 is a schematic block diagram of an example embodiment of a system according to the invention. The system supports the estimation of satellite locations at a mobile device.

The system comprises a mobile device 300 and, optionally, a server 310.

Mobile device 300 may be for instance a mobile communication device, like a smartphone, or a navigation device that is integrated in a vehicle, or any other mobile device that may have to be positioned. Mobile device 300 comprises a processor 301 that is linked to a first memory 302, to a second memory 304, to a GNSS receiver 306 and to a communication interface 307.

Processor 301 is configured to execute computer program code, including computer program code stored in memory 302, in order to cause mobile device 300 to perform desired actions.

Memory 302 stores computer program code for modeling a time-evolution of error components of satellite orbit models which are to be extended beyond their respective validity period; computer program code for computing satellite locations based on orbit models that may or may not be extended; computer program code for estimating values of error components for various satellites for a particular point in time based on a modeled time evolution of the error components; computer program code for correcting computed locations of satellites based on computed values of error components; and computer program code for performing positioning computations using the corrected locations of satellites. The computer program code may comprise for example similar program code as memory 102. In addition, memory 302 could store computer program code configured to realize other functions, for instance program code for application making use of computed positions of mobile device 300. In addition, memory 302 could also store other kind of data.

Processor 301 and memory 302 may optionally belong to a chip or an integrated circuit 303, which may comprise in addition various other components, for instance a further processor or memory. It may comprise for instance a working memory for processor 301.

Memory 304 is configured to store data, for example, sets of ephemeris data that have been broadcast by various satellites of one or more GNSS. Each set of ephemeris data constitutes a set of parameter values specifying an orbit model for a particular satellite for a particular validity period. Moreover, determined parameter values for a model of a time-evolution of error components may be stored for various satellites.

GNSS receiver 306 is configured to receive signals from satellites of one or more GNSS. By way of example, it could be a receiver for BeiDou and/or GPS satellite signals, but it could be a receiver for any other GNSS satellite signals as well. It is configured to perform measurements on these satellite signals, to extract navigation messages including ephemeris data and to decode the navigation messages.

Communication interface 307 may be for instance a data interface. It may enable a communication via a cellular communication network or via a wireless local area network or via Bluetooth, etc. It is to be understood that mobile device 300 may comprise several types of communication interfaces. Communication interface 307 may be for instance a comprehensive communication component, like a cellular engine and an associated transceiver. Alternatively, it may comprise only a transceiver, which may be controlled by processor 301 when executing corresponding program code from memory 302.

Component 303 or mobile device 300 could be an example embodiment of an apparatus according to the invention.

Server 310 may be a positioning assistance server or any other kind of server that is configured to provide assistance data to mobile devices via any suitable communication network. It may be configured, for instance, to provide data to mobile devices via the Internet and further via any kind of wireless link. Alternatively, it could be for instance a part of a cellular network, via which the data may be transmitted. The assistance data provided by the server 310 may be of different kinds. It may include for example a reference location, ionosphere corrections, or entire sets of ephemeris data for various satellites, etc.

It is to be understood that the presented example system may be varied in many ways by adding, omitting and/or modifying components.

Example operations in the system of FIG. 3 will now be described with reference to FIGS. 4 to 9.

Figure 4:
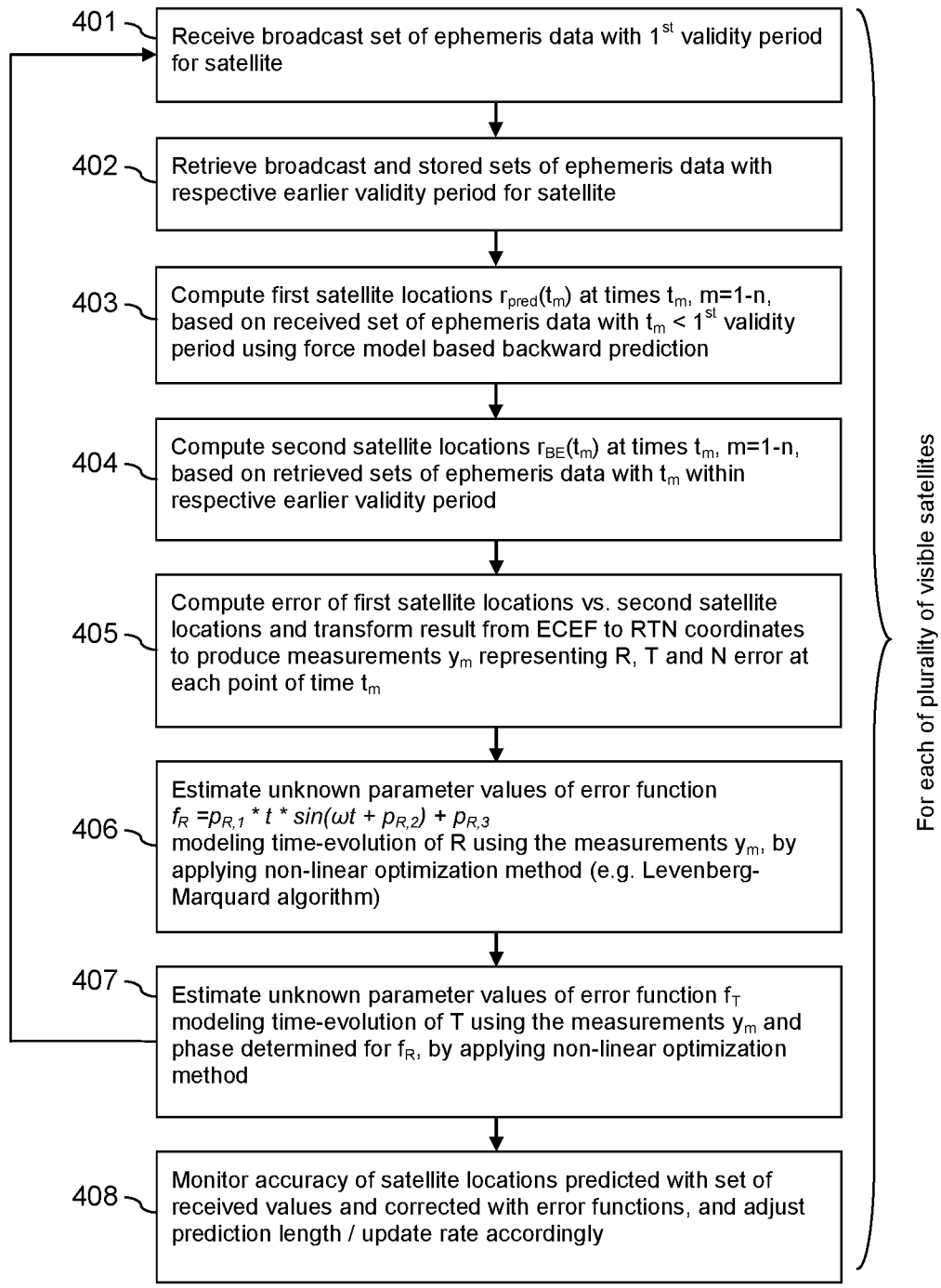
FIG. 4 is a flow chart illustrating example operations in the apparatus of FIG. 3.
Figure 8:
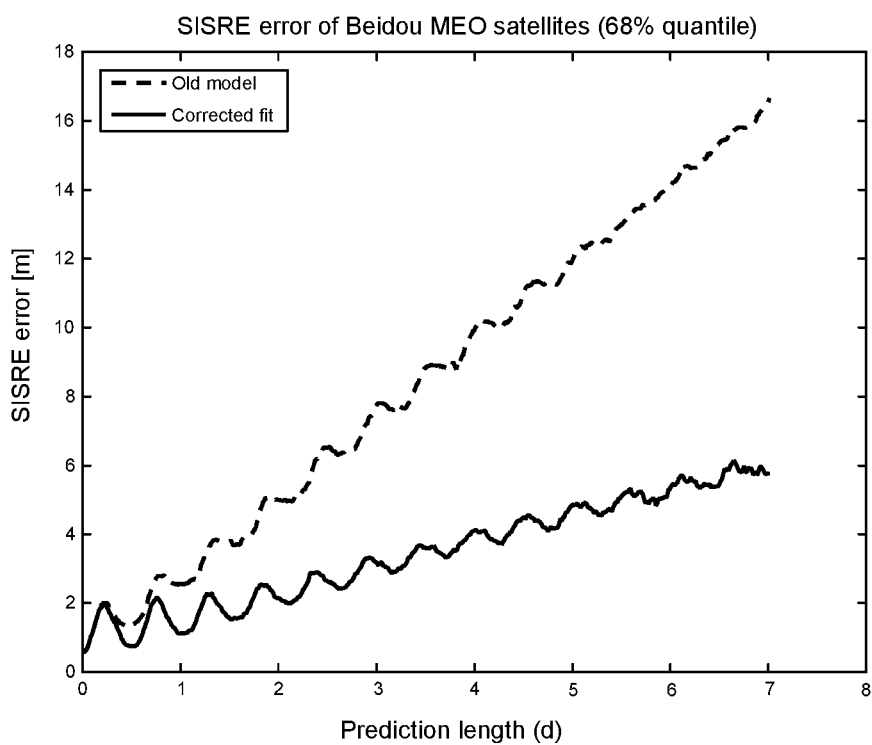
FIG. 8 is a diagram illustrating an example improvement of orbital predictions.
Figure 9:
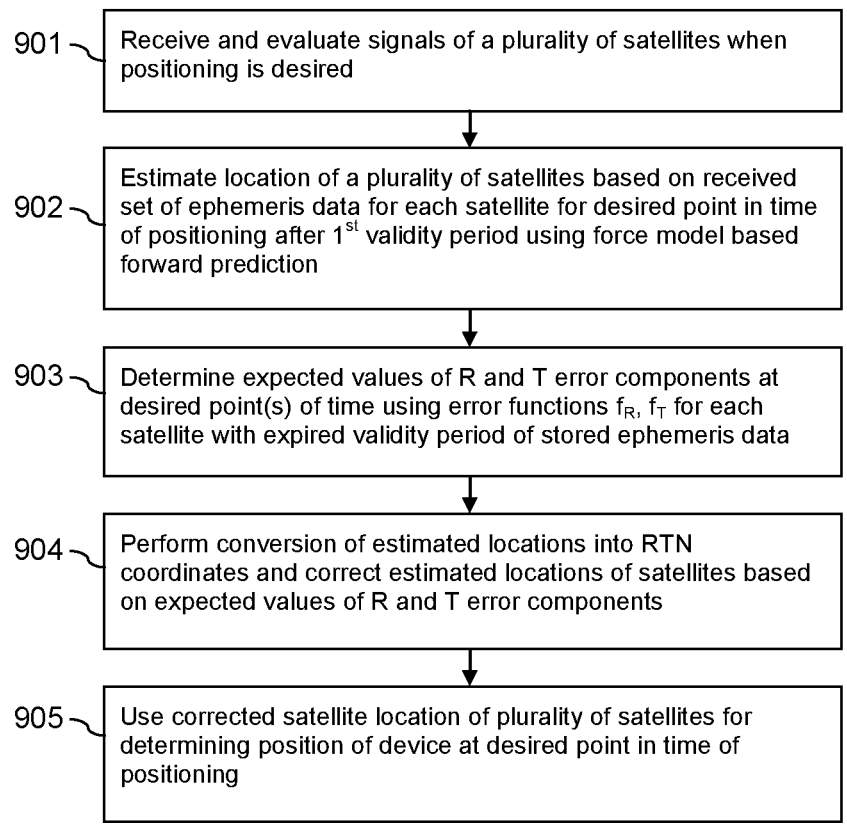
FIG. 9 is a flow chart illustrating further example operation in the apparatus of FIG. 3.

FIGS. 4 and 9 are flow charts illustrating operations at mobile device 300. Processor 301 and some of the program code stored in memory 302 cause mobile device 300 to perform the presented operations when the program code is retrieved from memory 302 and executed by processor 301. FIGS. 5 to 8 are diagrams illustrating an example error compensation that may be achieved with the operations in FIGS. 4 and 9.

FIG. 4 illustrates an example modeling of the time-evolution of error components. The operation is performed for a plurality of satellites. The processing for different satellites may be performed in parallel, as far as the satellites are visible at the same time, or subsequently over time.

Mobile device 300 regularly receives signals transmitted by visible GNSS satellites via GNSS receiver 306. GNSS receiver 306 performs measurements on the signals to obtain a satellite ID of a respective satellite and to determine a time of arrival of navigation messages. However, in order to save processing power, the content of navigation messages including the current set of ephemeris data of the satellite may only be decoded from time to time. Just to provide an example, for each satellite one set of ephemeris data may be obtained each day during four consecutive days once every second week. The operations of GNSS receiver 306 may optionally be supported by any kind of assistance data that may be provided by server 310.

Processor 301 receives the sets of ephemeris data from GNSS receiver 306 and causes storage of the sets of ephemeris data in memory 304. Thus, four sets of ephemeris data with four different validity periods of e.g. 4 hours are available.

The operation illustrated in FIG. 4 starts with receipt of the latest set of ephemeris data, which has a first validity period. (action 401) This set of ephemeris data may be received at processor 301 directly from GNSS receiver 306; or the data may be stored first in memory 304 and received at processor 301 from memory 304 for action 401. The latest set of ephemeris data is to be used for the next two weeks as a basis for determining the location of the satellite.

However, as indicated above, once the validity period has passed, the error in the determined satellite location increases significantly over time, even if using a force model for predicting the location.

The effect of orbit errors to the positioning accuracy can be quantified using the Signal In Space Range Error (SISRE). SISRE is related to the geometry between the satellite and the positioning device. For GPS, SISRE is given by:

$$\sigma_{SISRE,GPS} = \sqrt{\sigma_{\Delta R - c\Delta t}^2 + \frac{1}{49}(\sigma_{\Delta T}^2 + \sigma_{\Delta N}^2)}, \quad (1)$$

where $\sigma_{\Delta R-c\Delta t}^2$, $\sigma_{\Delta T}^2$ and $\sigma_{\Delta N}^2$ describe errors in the radial (R), tangential (T) and normal (N) directions respectively. The radial error component $\sigma_{\Delta R-c\Delta t}^2$ includes the effects of satellite's clock offset and radial orbital error.

The radial error is the most significant component in the SISRE. The tangential error usually grows very fast compared to the radial and normal errors and becomes significant in very long predictions. The scale of the normal error is usually comparable to the radial error and gives therefore a very small contribution to the overall SISRE. For useful ephemeris extension, the SISRE is required to stay within a predefined threshold. Therefore, reducing the radial and tangential orbital error components may result in longer validity and better quality of the ephemeris extension.

Figure 5:
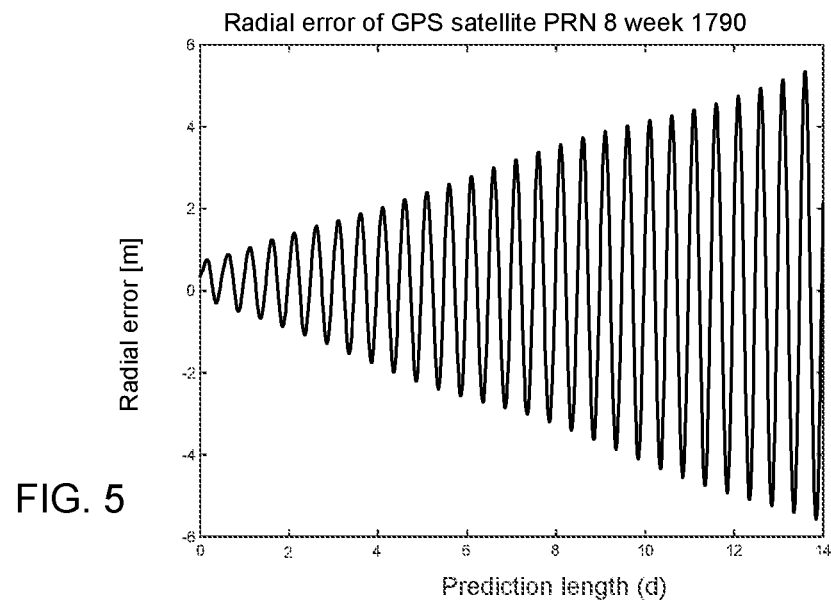
FIG. 5 is a diagram illustrating an example evolution of a radial error in a two-week prediction of a satellite location.

The error components contain systematic features. For illustration, a typical evolution of the radial error component in meters [m] over a prediction length in days [d] when using a conventional force model based ephemeris extension is illustrated in FIG. 5 for a selected GPS satellite.

Therefore, the subsequent actions of FIG. 4 aim at reducing the influence of radial and tangential error components by exploiting these systematic features.

The time-evolution of the radial and tangential error components can be modeled by means of separate error functions for each component.

Let $f_R(t,p_R)$ and $f_T(t,p_T)$ be example functions of a general model describing the error components in radial (R) and tangential (T) directions at time t. The vectors $p_R$ and $p_T$ contain parameters of unknown values. As an example, the radial error function for GPS may be given by:

$$f_R(t,p_R) = p_{R,1} * t * \sin(\omega t + p_{R,2}) + p_{R,3}, \quad (2)$$

where $p_R = [p_{R,1}, p_{R,2}, p_{R,3}]$, $\omega = 2\pi/T$ and T is the period of the error. Unmodeled forces usually behave in frequencies of one-cycle-per-orbital-revolution (1CPR) and therefore T is given by the orbital period of the satellite. Most of the errors are in frequencies of 1CPR, but other significant frequencies may also be identified, such as the frequency of orbiting of the Moon. Sinusoidal components in other frequencies may also be added to equation (2) to take into account such forces.

The function for the tangential error component may be defined in a similar manner.

The functions $f_R(t,p_R)$ and $f_T(t,p_T)$ thus comprise parameters that have to be specified for each satellite and the current time. This may be achieved by fitting the functions and thus the general model as a whole to a number of values of the respective error component that are determined for different points in time.

In order to determined such values of an error component, mobile device 300 retrieves the latest sets of ephemeris data having a respective earlier validity period than the first validity period from memory 304. (action 402)

Mobile device 300 moreover computes a first plurality of locations $r_{pred(t_m)}$ of the satellite for a plurality of points in time $t_m$ with m=1, 2, . . . , n based on the set of ephemeris values received in action 401. (action 403) The points in time may lie in the past and precede the associated validity period, meaning that a backward prediction is performed using a force model. The points in time may be selected such that each point in time lies within one of the mentioned earlier validity periods. The locations may be estimated in an ECEF coordinate system.

For the force model, the equation of motion of the satellite may be for instance $$\ddot{r}_{sat} = a_{Earth} + a_{sun} + a_{Moon} + a_{SRP},$$

where $a_{Earth}$, $a_{Sun}$ and $a_{moon}$ are the accelerations caused by the gravitation of the Earth, the Sun and the Moon, respectively. The final term $a_{SRP}$ is the acceleration caused by the solar radiation pressure. $\ddot{r}_{sat}$ denotes the second derivative of the position of the satellite. Note that positions, velocities and accelerations are 3-dimensional vectors. The models for the acceleration terms may be defined as described in the following:

The acceleration caused by the Earth is modeled with spherical harmonics expansion. The acceleration is calculated as $$a_{Earth} = \nabla \frac{GM_E}{r} \sum_{n=0}^{\infty} \sum_{m=0}^{n} \left[\left(\frac{R_E}{r}\right)^n P_{nm}(\sin \phi)(C_{nm} \cos(m\lambda) + S_{nm} \sin(m\lambda))\right],$$

where the coefficients $C_{nm}$ and $S_{nm}$ are from EGM2008 model.

The Sun and the Moon are considered as point masses and the accelerations caused by them are calculated in a similar way. The acceleration caused by the gravity of a celestial body may be calculated with $$a_{cb} = GM_{cb}\left(\frac{r_{cb} - r}{\|r_{cb} - r\|^3} - \frac{r_{cb}}{\|r_{cb}\|^3}\right).$$

For solar radiation pressure, a two-parameter empirical model may be used:

$$a_{SRP} = \lambda\left(\alpha_1 \frac{1}{r_{Sun}} e_{Sun} + \alpha_2 e_y\right),$$

where $\alpha_1$ and $\alpha_2$ are parameters which are estimated for each satellite individually. Parameter $\lambda$ determines if the satellite is fully or partially in Earth's shadow.

Using the equations above, it is possible to calculate both the position and the velocity of the satellite with numerical methods.

Mobile device 300 moreover computes a second plurality of locations $r_{BE(t_m)}$ of the satellite for the same plurality of points in time $t_m$ with m=1, 2, . . . , n based on the sets of ephemeris data retrieved in action 402. (action 404) For each point in time, one of the retrieved sets of ephemeris data, which is associated with a validity period comprising the point in time, is used for computing the satellite location. It is to be understood that it would also be possible to use a single set of ephemeris data, in case the set of ephemeris data has a sufficiently long validity time. The length of time for which a set of ephemeris data is valid varies between different satellite systems, so that at least for some systems, more than one retrieved set of ephemeris data may be needed to obtain a sufficient number and time span of observations. The satellite locations may be computed again in an ECEF coordinate system.

Mobile device 300 may now compute for each point in time a deviation of the first satellite location computed in action 403 compared to the second satellite location computed in action 404. The deviation may be transformed into an RTN coordinate system. (action 405) The computation may be performed for instance using the following equation:

$$y_m = R_{RTN}(r_{pred}(t_m) - r_{BE}(t_m)), \qquad (3)$$

where $R_{RTN}$ is a transformation matrix from ECEF to RTN coordinates.

With the definition of an RTN coordinate system presented above, the error components are perpendicular to each other. If the unit (column) vectors in these directions are notated as $e_R$, $e_T$ and $e_N$, the transformation matrix from ECEF (or Earth-centered inertial, ECI) to RTN is $$R_{RTN} = [e_R, e_T, e_N]$$

The results are RTN errors $$y_m^T = [y_{R,m}, y_{T,m}, y_{N,m}], m=1, 2, \ldots, n \qquad (4)$$

between the satellite locations computed using backward predictions and the satellite locations computed based on stored sets of ephemeris data.

Figure 6:
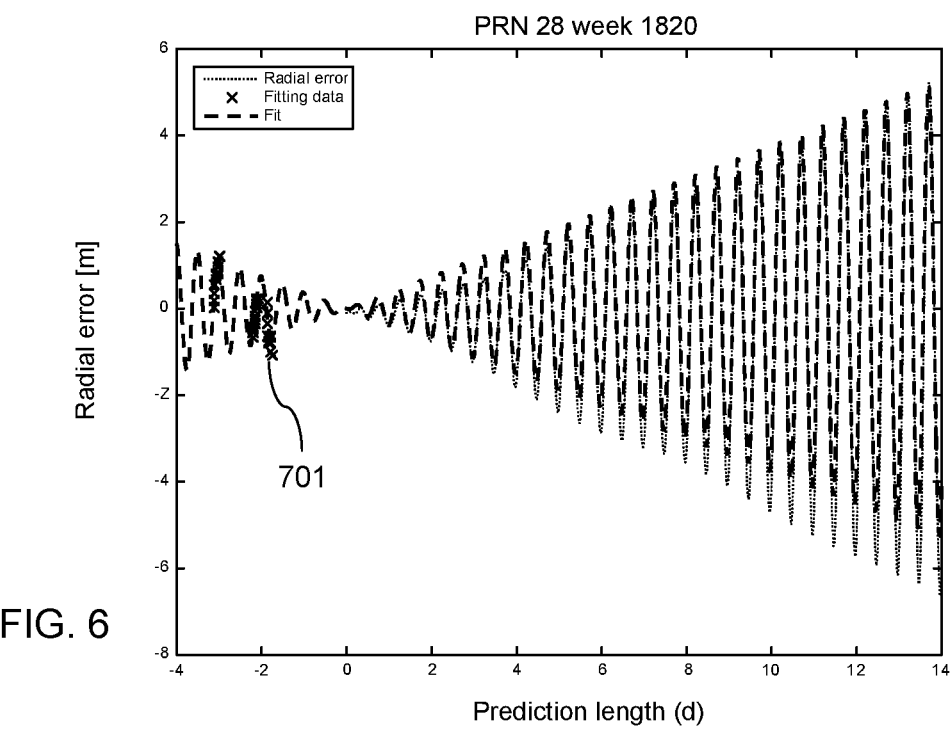
FIG. 6 is a diagram illustrating an example of a predicted time-evolution of a radial error over two weeks estimated from backwards prediction of a satellite location.

FIG. 6 is a diagram presenting an example of a true radial error in meters in the orbit of a particular satellite that is predicted based on a single set of ephemeris data with force model based forward prediction over two weeks and force model based backward prediction over four days. The true radial error is indicated with a dotted line (labeled "Radial error"). FIG. 6 furthermore presents example values of a radial error component that may be computed in action 405, indicated by a number of crosses (labeled "Fitting data") in a period preceding the validity period of the set of ephemeris data.

The R and T error components may then be used for fitting the functions $f_R(t, p_R)$ and $f_T(t, p_T)$, respectively, to the current situation for the particular satellite by determining suitable parameter values. That is, the values of $y_{R,m}$ are used as output values of $f_R(t, p_R)$ for the times $t=t_m$ to determine the unknown parameter values of the equation for the radial error component, and the values of $y_{T,m}$ are used as output values of $f_T(t, p_T)$ for the times $t=t_m$ to determine the unknown parameter values of the equation for the tangential error component.

The parameter values may be estimated for example using the following equation:

$$p_s = \arg\min_p \Sigma_{i=1}^n (y_{s,i} - f_s(t_i, p))^2, s \in \{R, T\} \qquad (5)$$

To solve this non-linear optimization problem, the Levenberg-Marquardt (L-M) algorithm or some other non-linear optimization method may be used. Details for the L-M algorithm can be taken for example from: "*An algorithm for least-squares estimation of nonlinear parameters.*" by Marquardt, D., in Journal of the Society for Industrial and Applied Mathematics, 11(2):431-441, 1963. The initial guess for the L-M algorithm can be obtained from priors formed using historical data.

While the values of the radial and the tangential error components may be computed independently from each other by solving the above problem, it may be noted that the phases of the error components have a very strong correlation.

Therefore, mobile device 300 may use at first the values of the radial error component for estimating the unknown parameter values of the function $f_R(t, p_R)$ and thus to fit the function to the current situation for a particular satellite by minimizing the above equation. (action 406) The resulting specified function is a model of the time-evolution of the values of the radial error component.

Next, mobile device 300 may use the values of the tangential error component for estimating the unknown parameter values of a function $f_T(t, p_T)$ and thus to fit the function to the current situation for the particular satellite by minimizing the above equation. In this case, however, the phase of the radial fit resulting in action 406 is used in the tangential fitting to reduce the number of parameters and to obtain a more accurate estimate. (action 407) The resulting specified function is a model of the time-evolution of the values of the tangential error component.

The determined parameter values of the error functions for radial and tangential error component may be stored in memory 304 for later use.

If the fit is successful, the error from the radial and tangential error components in satellite location predictions can be reduced significantly based on the specified error functions.

For the example situation in FIG. 6, a curve representing the modeled time-evolution of the radial error component is presented in FIG. 6 with a bold dashed line (labeled "Fit"). As can be seen, the modeled curve is quite close to the true radial error.

Figure 7:
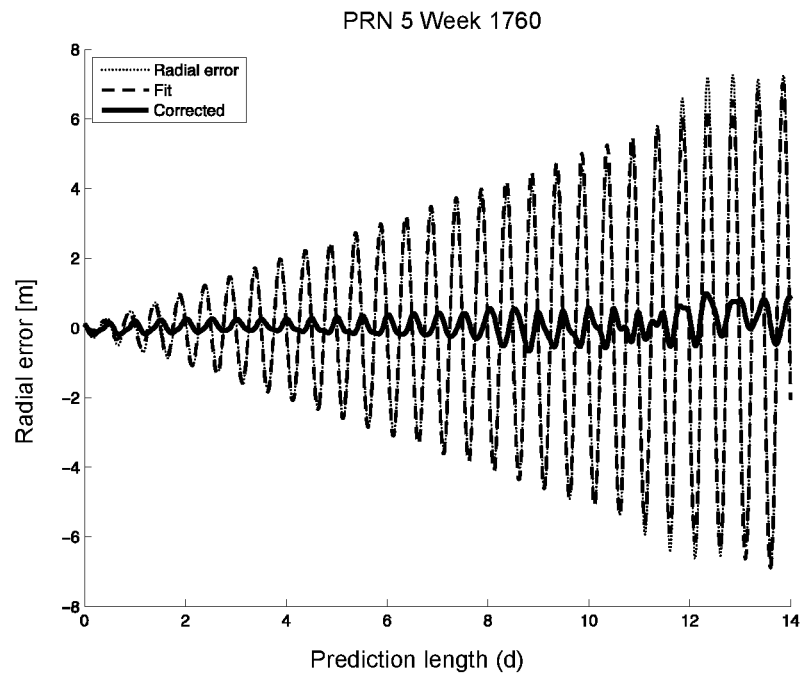
FIG. 7 is a diagram illustrating an example of a reduction of an error as illustrated in FIG. 5 when applying a correction using an estimated error as illustrated in FIG. 6.

FIG. 7 is a diagram illustrating an example of a possible error correction in the case of a successful modeling of the time evolution of a radial error in meters. A dotted line shows again the evolution of a true radial error (labeled "Radial error") for a particular satellite when extending the use of a set of ephemeris data to two weeks. A bold dashed line (labeled "Fit") shows again a modeled time-evolution of the radial error component over the two weeks. In addition, a solid bold line (labeled "Corrected") shows the remaining values of the radial error over time for the two weeks when subtracting the modeled radial error from the true radial error. As can be seen, the remaining error is reduced significantly.

Actions 401 to 407 may be repeated at regular intervals in order to update the ephemeris data from time to time. The repetition rate may be fixed or variable.

Mobile device 300 may monitor the accuracy of satellite locations that have been predicted based on the set of received values and corrected using the determined error functions. Mobile device 300 may adjust the update rate and thus the prediction length accordingly. (action 408) This may take account of the risk that the optimization result may not be satisfactory in some cases.

A monitoring may be achieved for instance—starting from the second iteration of operations 401 to 407—by computing a location of the considered satellite with the set of ephemeris data received in action 401 for a point in time within the associated first validity period; predicting a location of the satellite for the same point in time with the set of ephemeris data received in the preceding iteration in action 401 and corrected with expected values of the radial and tangential error components using a time-evolution for both error components modeled in actions 406 and 407 of the preceding iteration; and comparing both locations. If the discrepancy exceeds a first threshold value, the repetition rate of the iteration may be increased. If the discrepancy falls short of a second threshold value, the repetition rate of the iteration may be decreased.

FIG. 8 is a diagram illustrating an example evolution of a SISRE error in meters of a satellite location that is predicted using a force model taking account of the four major forces but without correction (labeled "Old model") and with a correction using the modeled time-evolution of the radial and tangential error components (labeled "Corrected fit") over seven days. It can be seen that rise of the SISRE error is much flatter when using corrected satellite locations. The performance of the presented approach may differ with different satellites systems and types, but the improvement may be vast in each case. The example of FIG. 8 is based on a computation performed for a BeiDou Medium Earth Orbit (MEO) satellite. With BeiDou MEO satellites tracked during a one-week prediction, the SISRE 68% quantile dropped from 16 to 6 meters.

In action 408 of FIG. 4, the repetition rate of the process may also be set for instance such that the corrected SISRE error can be expected to remain below a predetermined threshold value, for instance below 6 meters or any other value.

FIG. 9 illustrates the application of the modeled time-evolution of the radial and tangential error components in positioning computations.

When mobile device 300 has to determine its own position at a particular point in time, it performs measurements on satellite signals received via GNSS receiver 306 to detect currently visible satellites and to determine the time of arrival of navigation messages. (action 901) Decoding the navigation messages is not required.

Mobile device 300 moreover estimates the respective location of a plurality of visible satellites. The estimation is based on the latest set of ephemeris data that is stored in memory 304 for the respective satellite. As far as the validity period for the set of ephemeris data has expired for any of the satellites, mobile device 300 uses in addition a force model based forward prediction for estimating the satellite location. (action 902)

It is assumed that for each of the satellites, a modeled time-evolution of the radial and tangential error components has been determined for the latest set of ephemeris data stored in memory 304 for this satellite.

Therefore, mobile device 300 may now determine for each satellite for which the validity period of the latest stored set of ephemeris data has expired, expected values of the error components at the desired point in time by using the general error functions, by specifying them with the previously determined and stored values for the unknown parameters and by using the desired point in time as input value of the error functions. The output of the radial error function will then be an expected value of the radial error and the output of the tangential error function will be an expected value of the tangential error of the predicted satellite location. (action 903)

The satellite locations estimated in action 902 may be converted into RTN coordinates and corrected individually with the error values determined in action 903 for the respective satellite, as far as the validity period of the latest stored set of ephemeris data for this satellite has expired. (action 904)

Mobile device 300 may then use the corrected satellite locations of a plurality of visible satellites along with the measurement results of action 901 for determining the position of mobile device 300. (action 505) The determined position may then be used in any application requiring the position of mobile device 300.

The process of actions 901 to 905 may be repeated in a loop, if the position of mobile device 300 is to be tracked, for instance for use in a navigation application.

It is to be understood that the presented example operations may be varied in many ways.

For instance, the order of actions could be modified. To provide an example, the first satellite locations could also be computed in line with action 403 of FIG. 4 before the stored sets of ephemeris data are retrieved in action 402. Furthermore, the second satellite locations could also be computed in line with 404 before the first satellite locations are computed in action 403. Furthermore, the first and second satellite locations could also be computed in parallel. To provide another example, for monitoring the accuracy of satellite locations, action 408 could be performed any time after action 401, starting from the second iteration.

Furthermore, for example, instead of using a backward prediction in action 403, it would also be possible to determine first satellite locations using the first set of ephemeris data within the first validity period (and possibly using a further set of ephemeris data within a further validity period) and to determine second satellite locations in action 404 for the same points in time based on the retrieved sets of ephemeris data using a forward prediction.

Furthermore, for example, while the presented approach concentrates on describing the method for the most significant radial and tangential error components, but can be easily extended for predicting the normal error component also.

Furthermore, for example, the approach presented with reference to FIG. 2 or with reference to FIG. 4 could also be implemented in a stationary device, like server 306, which performs the computations for various mobile devices and provides the respective current set of ephemeris data and associated time-evolution model data for each satellite for use by mobile devices.

FIGS. 2, 4 and 9 may also be understood to represent exemplary functional blocks of a computer program code for supporting an estimation of satellite locations.

Summarized, certain embodiments of the invention may model of a time-evolution of the values of individual error components based on previously observed values of the error components. As a result, certain embodiments of the invention may have the effect that they enable a reduction of the values or error components (like RTN error components) in satellite navigation system orbit prediction without introducing additional terms to the satellites' equation of motion. The approach may be computationally light and give a significant reduction in the SISRE, and thus increase the quality of an extended use of a set of ephemeris data and the time during which a set of ephemeris data can be used.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that requires software or firmware for operation, even if the software or firmware is not physically present.

This definition of circuitry applies to all uses of this term in this application, including in any claims. As a further example, as used in this application, the term circuitry also covers an implementation of merely a processor (or multiple processors) or portion of a processor and its (or their) accompanying software and/or firmware. The term circuitry also covers, for example and if applicable to the particular claim element, a baseband integrated circuit or applications processor integrated circuit for a mobile phone or a similar integrated circuit in server, a cellular network device, or other network device.

Any of the processors mentioned in this text could be a processor of any suitable type. Any processor and memory may comprise but is not limited to one or more single-core processor(s), one or more dual-core processor(s), one or more multi-core processor(s), one or more microprocessor(s), one or more digital signal processor(s), one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory, a random access memory, a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The functions illustrated by processor 101 in combination with memory 102, or by processor 301 in combination with memory 302 or by the component 303 can be viewed as means for computing a first plurality of locations of a satellite of a satellite navigation system for a plurality of points in time based on a first set of parameters values of an orbit model, the first set of parameters values broadcast by the satellite for a first validity period; means for computing a second plurality of locations of the satellite for the plurality of points in time based on at least one second set of parameter values of an orbit model, the at least one second set of parameter values broadcast by the satellite earlier than the first set of parameter values for at least one second validity period, wherein for computing the first plurality of locations and the second plurality of locations of the satellite, the first validity period or the at least one second validity period is extended by an equation of motion for the satellite, which includes at least one force acting on the satellite; means for computing a value of at least one error component for each of the plurality of points in time by comparing the computed first plurality of locations of the satellite with the computed second plurality of locations of the satellite; means for fitting parameter values of a model having at least one periodic component to the computed values of the at least one error component to obtain a model of a time-evolution of values of the at least one error component; and means for providing the model of the time-evolution of the values of the at least one error component as a basis for a correction of locations of the satellite that are computed based on the first set of parameter values for points in time outside of the first validity period.

The program codes in memory 102 or memory 302 can also be viewed as comprising such means in the form of functional modules.

It will be understood that all presented embodiments are only exemplary, that features of these embodiments may be omitted or replaced and that other features may be added. Any mentioned element and any mentioned method step can be used in any combination with all other mentioned elements and all other mentioned method step, respectively. It is the intention, therefore, to be limited only as indicated by the scope of the claims appended hereto.

What is claimed is:

1. A method performed by a mobile device embodied by a mobile communication device or a navigation device, the mobile device comprising a processor and a global navigation satellite system (GNSS) receiver, the method comprising:
   receiving, with the GNSS receiver, a first set of parameter values broadcast by a satellite of a satellite navigation system;
   computing a first plurality of locations of the satellite of the satellite navigation system for a plurality of points in time based on the first set of parameters values of an orbit model, the first set of parameters values broadcast by the satellite for a first validity period;
   computing a second plurality of locations of the satellite for the plurality of points in time based on at least one second set of parameter values of an orbit model, the at least one second set of parameter values broadcast by the satellite earlier than the first set of parameter values for at least one second validity period, wherein for computing the first plurality of locations and the second plurality of locations of the satellite, the first validity period or the at least one second validity period is extended by an equation of motion for the satellite, which includes at least one force acting on the satellite;
   computing a value of at least one error component for each of the plurality of points in time by comparing the computed first plurality of locations of the satellite with the computed second plurality of locations of the satellite;
   with the processor, fitting parameter values of a model having at least one periodic component to the computed values of the at least one error component to obtain a model of a time-evolution of values of the at least one error component; and
   providing the model of the time-evolution of the values of the at least one error component as a basis for a correction of locations of the satellite that are computed based on the first set of parameter values for points in time outside of the first validity period.

2. The method according to claim 1, wherein each of the first set of parameter values and the at least one second set of parameter values comprise a respective set of ephemeris data.

3. The method according to claim 1, wherein the first plurality of locations of the satellite and the second plurality of locations of the satellite are computed as coordinates in an Earth centered, Earth fixed coordinate system, and wherein computing a value of at least one error component for each of the plurality of points in time by comparing the computed first plurality of locations of the satellite with the computed second plurality of locations of the satellite comprises transforming deviations between the computed first plurality of locations of the satellite and the computed second plurality of locations of the satellite into values of at least one error component in a Radial-Tangential-Normal coordinate system.

4. The method according to claim 1, wherein the at least one error component comprises:
 a radial error component and/or
 a tangential error component and/or
 a normal error component
 of a Radial-Tangential-Normal satellite centered coordinate system.

5. The method according to claim 1, wherein the at least one error component comprises at least two error components and wherein the model of a time-evolution of the values of the at least one error component comprises a separate error function for each of the at least two error components.

6. The method according to claim 5, wherein the at least one error component comprises at least a radial error component and a tangential error component of a Radial-Tangential-Normal satellite centered coordinate system, the method further comprising: using a phase of an error function for the radial error component obtained by fitting parameter values of the model having at least one periodic component to the computed values of the radial error component in fitting parameter values of the model having at least one periodic component to the computed values of the tangential error component to obtain an error function for the tangential error component.

7. The method according to claim 1, wherein fitting parameter values of a model having at least one periodic component to the computed values of the at least one error component comprises:
 applying a non-linear optimization algorithm and/or
 applying a non-linear least square fitting algorithm and/or
 applying a Levenberg-Marquardt algorithm.

8. The method according to claim 1, further comprising:
 monitoring a quality of the obtained model of a time-evolution of the values of the at least one error component; and
 adjusting a repetition rate of obtaining a model of a time-evolution of the values of the at least one error component based on the monitored quality.

9. The method according to claim 1, further comprising
 computing a location of the satellite at a particular point in time based on the first set of parameter values;
 estimating a value of the at least one error component for the particular point in time using the provided model of the time-evolution of the values of the at least one error component;
 correcting the computed location of the satellite based on the estimated value of the at least one error component; and
 computing a position of the mobile device at the particular point in time using the corrected location of the satellite.

10. The method according to claim 1, further comprising determining a position of the mobile device based upon the correction of the locations of the satellite.

11. The method according to claim 10, further comprising using the position of the mobile device in a navigation application.

12. An apparatus of a mobile device embodied by a mobile communication device or a navigation device, the apparatus comprising at least one processor, at least one memory including computer program code and a global navigation satellite system (GNSS) receiver, the at least one memory and the computer program code configured to, with the at least one processor, cause the apparatus at least to perform:
 receive, with the GNSS receiver, a first set of parameter values broadcast by a satellite of a satellite navigation system;
 compute a first plurality of locations of the satellite of the satellite navigation system for a plurality of points in time based on the first set of parameters values of an orbit model, the first set of parameters values broadcast by the satellite for a first validity period;
 compute a second plurality of locations of the satellite for the plurality of points in time based on at least one second set of parameter values of an orbit model, the at least one second set of parameter values broadcast by the satellite earlier than the first set of parameter values for at least one second validity period, wherein for computing the first plurality of locations and the second plurality of locations of the satellite, the first validity period or the at least one second validity period is extended by an equation of motion for the satellite, which includes at least one force acting on the satellite;
 compute a value of at least one error component for each of the plurality of points in time by comparing the computed first plurality of locations of the satellite with the computed second plurality of locations of the satellite;
 fit parameter values of a model having at least one periodic component to the computed values of the at least one error component to obtain a model of a time-evolution of values of the at least one error component; and
 provide the model of the time-evolution of the values of the at least one error component as a basis for a correction of locations of the satellite that are computed based on the first set of parameter values for points in time outside of the first validity period.

13. The apparatus according to claim 12, wherein each of the first set of parameter values and the at least one second set of parameter values comprise a respective set of ephemeris data.

14. The apparatus according to claim 12, wherein the first plurality of locations of the satellite and the second plurality of locations of the satellite are computed as coordinates in an Earth centered, Earth fixed coordinate system, and wherein computing a value of at least one error component for each of the plurality of points in time by comparing the computed first plurality of locations of the satellite with the computed second plurality of locations of the satellite comprises transforming deviations between the computed first plurality of locations of the satellite and the computed second plurality of locations of the satellite into values of at least one error component in a Radial-Tangential-Normal coordinate system.

15. The apparatus according to claim 12, wherein the at least one error component comprises:
 a radial error component and/or
 a tangential error component and/or
 a normal error component of a Radial-Tangential-Normal satellite centered coordinate system.

16. The apparatus according to claim 12, wherein the at least one error component comprises at least two error components and wherein the model of a time-evolution of the values of the at least one error component comprises a separate error function for each of the at least two error components.

17. The apparatus according to claim 16, wherein the at least one error component comprises at least a radial error component and a tangential error component of a Radial-Tangential-Normal satellite centered coordinate system, and wherein the at least one memory and the computer program code are further configured to, with the at least one processor, cause the apparatus to use a phase of an error function for the radial error component obtained by fitting parameter values of the model having at least one periodic component to the computed values of the radial error component in fitting parameter values of the model having at least one periodic component to the computed values of the tangential error component to obtain an error function for the tangential error component.

18. The apparatus according to claim 12, wherein fitting parameter values of a model having at least one periodic component to the computed values of the at least one error component comprises:
applying a non-linear optimization algorithm and/or
applying a non-linear least square fitting algorithm and/or
applying a Levenberg-Marquardt algorithm.

19. The apparatus according to claim 12, wherein the at least one memory and the computer program code are further configured to, with the at least one processor, cause the apparatus to:
monitor a quality of the obtained model of a time-evolution of the values of the at least one error component; and
adjust a repetition rate of obtaining a model of a time-evolution of the values of the at least one error component based on the monitored quality.

20. The apparatus according to claim 12, wherein the at least one memory and the computer program code are further configured to, with the at least one processor, cause the apparatus to:
compute a location of the satellite at a particular point in time based on the first set of parameter values;
estimate a value of the at least one error component for the particular point in time using the provided model of the time-evolution of the values of the at least one error component;
correct the computed location of the satellite based on the estimated value of the at least one error component; and
compute a position of the apparatus at the particular point in time using the corrected location of the satellite.

21. The apparatus according to claim 12, wherein the apparatus is one of:
a module for a device; or
a chip for a device.

22. A non-transitory computer readable storage medium in which computer program code is stored, the computer program code when executed by a processor causing a mobile device embodied by a mobile communication device or a navigation device and comprising a processor and a global navigation satellite system (GNSS) receiver, to perform the following:
receive, with the GNSS receiver, a first set of parameter values broadcast by a satellite of a satellite navigation system;
compute a first plurality of locations of the satellite of the satellite navigation system for a plurality of points in time based on the first set of parameters values of an orbit model, the first set of parameters values broadcast by the satellite for a first validity period;
compute a second plurality of locations of the satellite for the plurality of points in time based on at least one second set of parameter values of an orbit model, the at least one second set of parameter values broadcast by the satellite earlier than the first set of parameter values for at least one second validity period, wherein for computing the first plurality of locations and the second plurality of locations of the satellite, the first validity period or the at least one second validity period is extended by an equation of motion for the satellite, which includes at least one force acting on the satellite;
compute a value of at least one error component for each of the plurality of points in time by comparing the computed first plurality of locations of the satellite with the computed second plurality of locations of the satellite;
fit parameter values of a model having at least one periodic component to the computed values of the at least one error component to obtain a model of a time-evolution of values of the at least one error component; and
provide the model of the time-evolution of the values of the at least one error component as a basis for a correction of locations of the satellite that are computed based on the first set of parameter values for points in time outside of the first validity period.

* * * * *